United States Patent Office 3,507,408
Patented Apr. 21, 1970

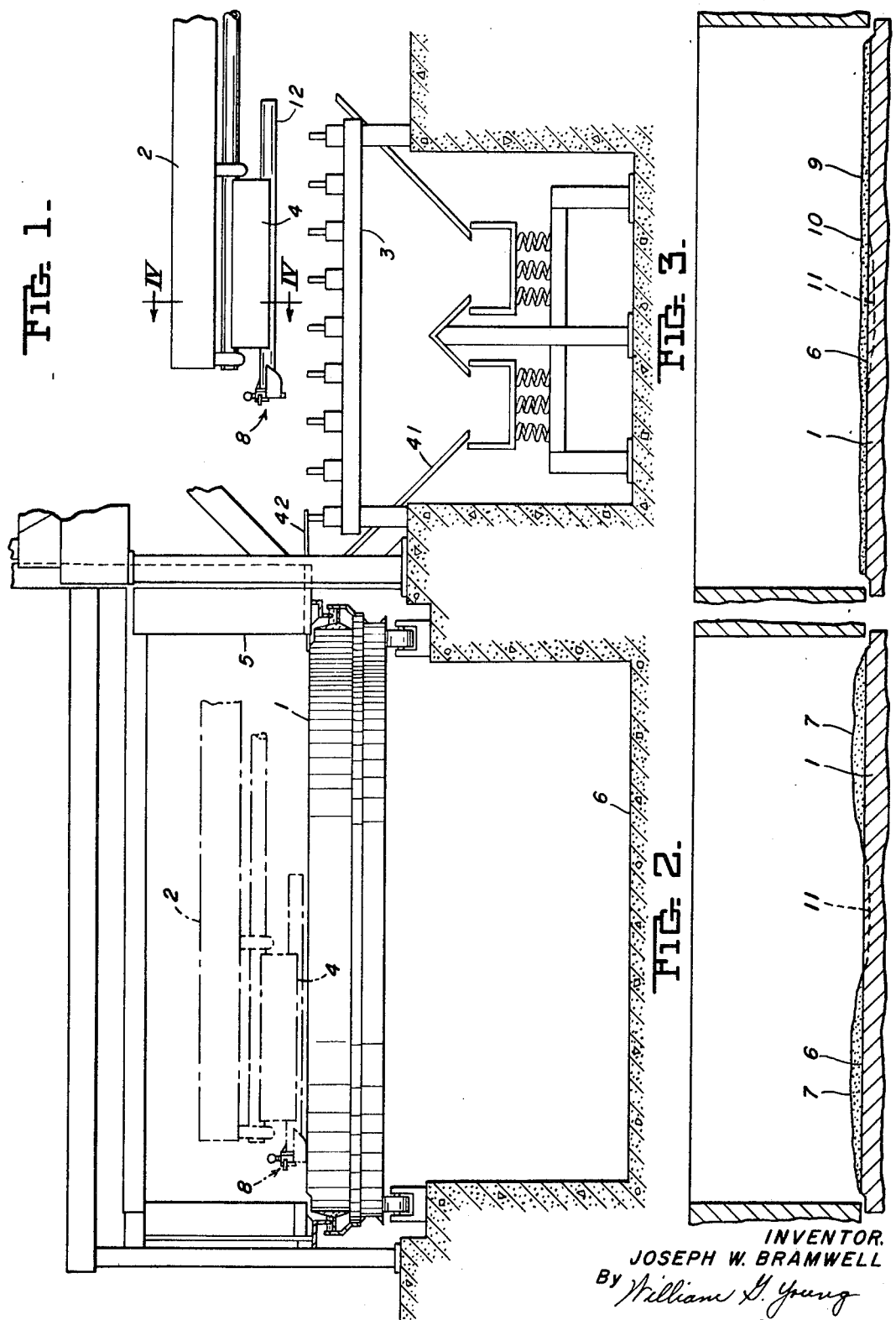

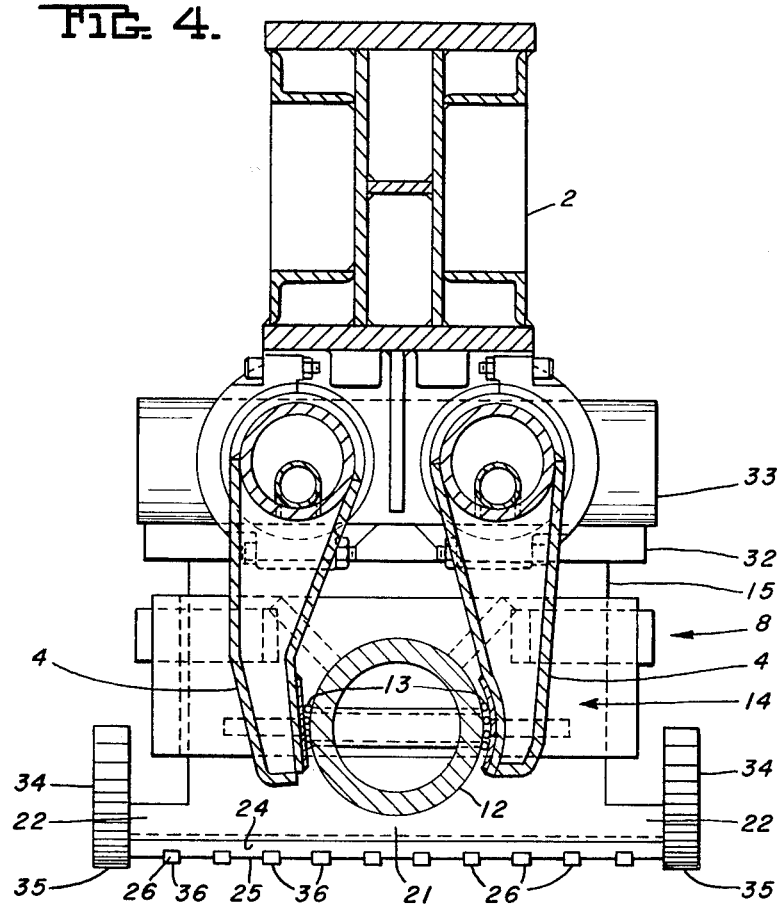
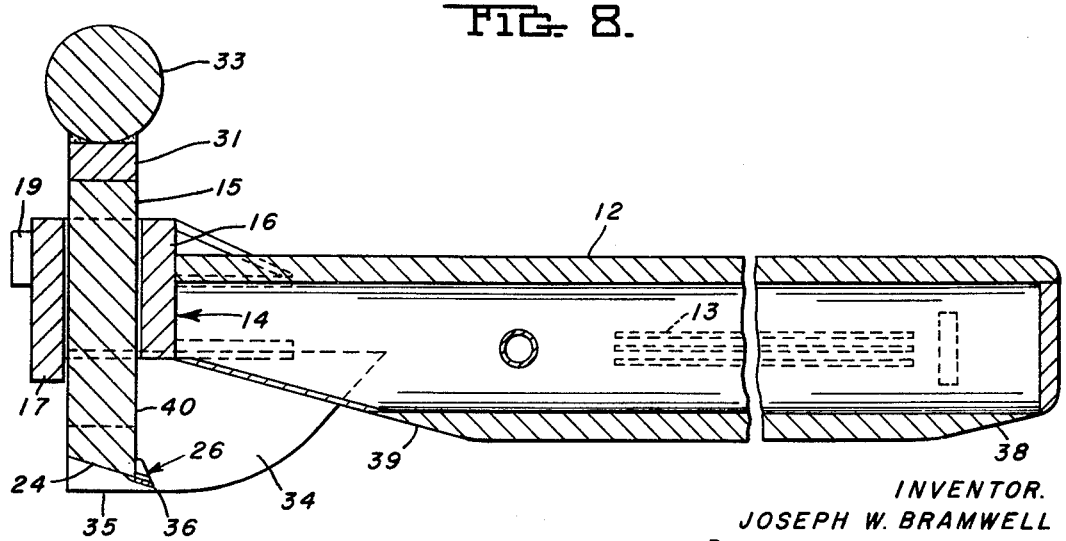

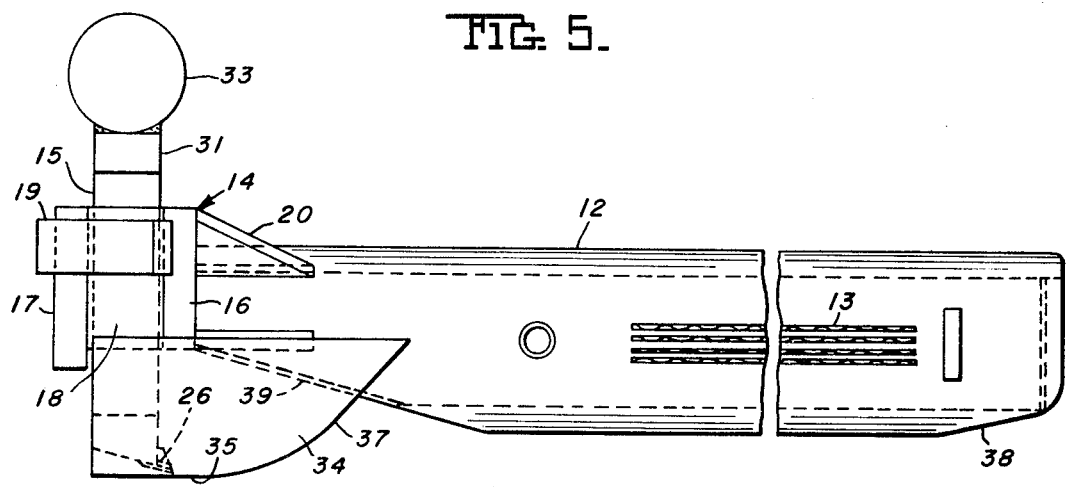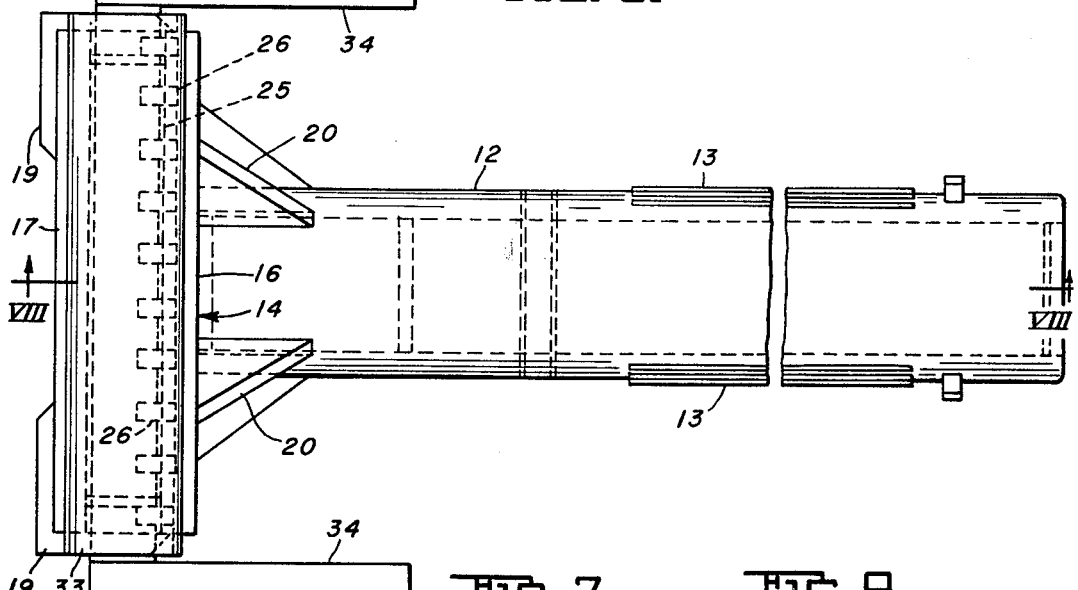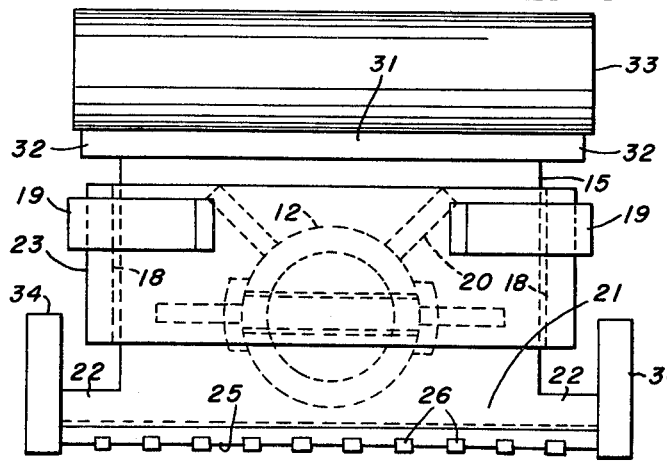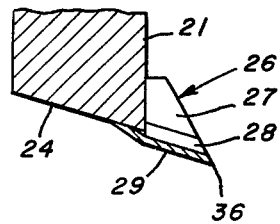

3,507,408
SCALE SCRAPER FOR TRAVELING-HEARTH FURNACE
Joseph W. Bramwell, Amherst, Ohio, assignor to United States Steel Corporation, a corporation of Delaware
Filed Jan. 19, 1968, Ser. No. 699,261
Int. Cl. F27b 9/22
U.S. Cl. 214—23                          5 Claims

ABSTRACT OF THE DISCLOSURE

Apparatus for leveling scale on the rotary hearth of a billet heating furnace comprising a scraper having a horizontal draft bar for engagement and operation by the jaws of a billet handling peel, and a socket at one end of the draft bar in which a scraper blade is mounted for guided vertical movement and has a gravitational bias for downward movement to a position in scraping engagement with scale on the furnace hearth. The scraper blade has skids which support it for movement with a sliding and floating action over the furnace hearth and hold it out of engagement with the furnace hearth. Its weight provides a gravitational bias for downward movement of the scraper blade in its guide socket which may be increased by weights mounted on its upper end.

---

This invention relates to a scraper for leveling loose material on a floor or other flat supporting surface, which, as indicated above, may be the rotary hearth of a billet heating furnace, and for removing solidified steel and excessive accumulations of the material on such supporting surface.

Although the scraper of this invention has general application for use in any apparatus where material needs to be leveled or removed with respect to a supporting surface, it is especially suited for leveling scale on the hearth of a rotary furnace of the type disclosed in U.S. Patent No. 2,293,549, dated Aug. 18, 1942, to S. F. Keener, and the disclosure of the invention in the following description and accompanying drawings is specific to its use for this purpose.

In the operation of rotary hearth furnaces of the type shown in the above-mentioned patent for seamless tube mills, severe operating and maintenance difficulties have resulted from the excessive production of iron oxide scale during the billet heating process, and the accumulation of such scale on the hearth of the furnace. Since the scale does not accumulate to a uniform level over the surface area of the hearth, billets subsequently introduced into the furnace are not supported uniformly along their entire length, and this results in the production of bent or crooked billets, which cause operating troubles when they are transferred over skid tables and conveyor rolls that require relatively straight billets for an efficient transfer operation. Crooked billets of this character also cause starting difficulties at the piercing mill of a nature which frequently results in lost mill time.

After scale has accumulated on the rotary hearth to an extent such that operating difficulties caused thereby are no longer tolerable, the scale on the hearth must be either leveled or removed from the furnace. At present, the removal of scale is essentially a manual operation and requires that the operation of the furnace be discontinued so that it may be cooled for the construction of access platforms and the utilization of manual labor and machinery to break up and clean out the scale. The cleaning of a furnace in this manner usually requires three to five days and is a costly process in that operation of a piercing mill or other equipment in seamless tube mills must be discontinued. Although proposals have been made previously for cleaning the hearth without the necessity of cooling the furnace, for example, by using the billet handling peel, either by itself or with auxiliary cleaning devices such as a chain to break up and remove the scale, such proposals have not proved satisfactory, and the practice of cooling the furnace and using manual labor to break up and remove the scale has continued to be regarded as essential in order to get the rotary hearth in condition for heating billets to the desired temperature without bending or the formation of crooked billets.

This invention, accordingly, has as one of its principal objects the provision of a scraper which may be operated by a billet handling peel to remove scale from a rotary hearth without the necessity of cooling the furnace. For this purpose, the invention contemplates a scraper blade that is moved radially over the rotary hearth with a floating action that levels the scale and to remove excessive quantities thereof from the furnace. In a manner to be described, the scraper blade has a gravitational bias for vertical movement downwardly to engage the scale with a digging action, and a guide socket or frame in which the scraper has a guided vertical movement, the frame in turn having a draft bar extending horizontally therefrom which is engaged and held by the jaws of the furnace peel for movement thereby radially across the rotary hearth.

Other objects and advantages of the invention will become apparent from the following description.

In the drawings, there is shown a preferred embodiment of this invention and its manner of application to a rotary hearth billet heating furnace. In this showing:

FIGURE 1 is a vertical sectional view taken in a vertical plane extending diametrally of a rotary hearth furnace with parts shown in side elevation, which illustrates the manner in which the scraper of this invention is operated by the billet handling peel for a furnace of this character;

FIGURE 2 is a fragmentary sectional view illustrating somewhat diagrammatically the manner in which iron oxide scale accumulates on the hearth of the furnace shown in FIGURE 1 and causes the production of crooked billets when supported thereon during the heating operation;

FIGURE 3 is a view similar to FIGURE 2 showing the condition of the scale on the furnace hearth after being leveled by the scraper of this invention;

FIGURE 4 is a sectional view, taken along the line IV—IV of FIGURE 2, but drawn to an enlarged scale, which illustrates the manner in which the peel of this invention is held by the clamping jaws of the furnace charging peel;

FIGURE 5 is a side elevational view of the scraper of this invention, in which a central portion of the scraper draft bar has been broken away;

FIGURE 6 is a plan view of the scraper shown in FIGURE 5;

FIGURE 7 is an end view looking in a direction from the left of FIGURES 5 and 6;

FIGURE 8 is a longitudinal sectional view taken substantially along the line VIII—VIII of FIGURE 6; and FIGURE 9 is an enlarged view of a portion of the scraper bar shown in FIGURE 8 which illustrates the manner in which the scraper teeth are secured at spaced intervals along the lower edge thereof.

FIGURE 1 illustrates the manner in which the invention is applied for the purpose of leveling iron oxide scale on the rotary hearth of a conventional billet heating furnace. The furnace in this showing is the same general type illustrated in the Keener patent mentioned above, to which reference is made for a more detailed disclosure thereof. For the purposes of this invention, it will be sufficient to point out that the furnace comprises a ring-shaped hearth 1 which is supported for rotation about a center to the left of the showing in FIGURE 1. After heating, the billets are removed from the furnace by a peel 2 which travels over a radial path from a position above hearth 1 as shown in dotted lines, to a position over a discharge table 3 as shown in solid lines. The peel 2 is equipped with a pair of pivotal jaws 4 for clamping engagement with a billet to suspend it on the peel for transfer from the hearth 1 to the discharge table 3. The conventional mechanism (not shown) for moving the peel 2 between the dotted and full line positions shown in FIGURE 1, also provides for moving it vertically from the down position shown in dotted lines, in which the jaws 4 may be operated into clamping engagement with the billet, to the up position in which such billet can be withdrawn through a door (not shown) in the wall 5 of the furnace.

By reason of exposure to heat in an oxidizing atmosphere, iron oxide scale forms on the surface of billets in the furnace. During normal operation of the furnace this scale breaks loose and falls to the floor 6 of the hearth 1 where it frequently collects in mounds 7 of different depths that are spaced relatively to each other as shown in FIGURE 2 of the drawings. As a consequence of the collection of scale in this manner, billets subsequently inserted in the furnace are supported at spaced points on the mounds 7 rather than on the hearth floor 6 at a uniform level along their entire length. This of course results in the production of crooked billets, the curvature of which varies with the extent to which the mounds 7 of scale extend above the hearth floor 6.

In accordance with the principles of this invention, the peel 2 and its clamping jaws 4 are used to hold and operate a scraper, which is designated by a whole the numeral 8, to level the scale mounds 7. After operation of the scraper 8 in a manner to be described, the scale 9 on the hearth 1 is distributed uniformly over the hearth floor 6 so that its upper surface 10 is level and horizontal as shown in FIGURE 3. The distribution of the scale 9 over the hearth 1 in this way further operates to fill depressions 11 in the floor 6, such as that designated diagrammatically by the dotted lines in FIGURE 2, and has the effect of repairing or improving the level condition of the surface of the hearth floor 6.

As shown in FIGURES 4 et seq. of the drawings, the scraper 8 comprises a tubular draft bar 12 which is gripped by the peel clamping jaws 4 to mount it on the peel 2 for operation thereby as shown in FIGURE 1 of the drawings. Rods 13 of "Stellite" or other hard tool-steel alloys may be welded on opposite sides of the tube 12 to enable it to be held more securely by the clamping jaws 4 as shown in FIGURE 4 of the drawings. At its outer end the tube 12 is secured to a rectangular frame 14 which provides a socket in which the body 15 of the scraper blade is mounted for vertical guided movement. The socket frame 14 comprises parallel side plates 16 and 17 which are secured in spaced relation by end plates 18 which have their opposite vertical edges welded to facing side surfaces of the plates 16 and 17. Reinforcing angle straps 19 are welded in position at the corners of the plates 17 and 18 to make the frame 14 more rigid. The tube 12 is welded to the side plate 16 at a point located centrally thereof as shown in FIGURE 7, the connection of the frame 14 to the tube 12 being reinforced by gusset plates 20.

The interior facing surfaces of the frame plates 16, 17 and 18 of the socket 14 define a vertically extending opening of rectangular shape in which the body 15 of the scraper blade has a guided vertical movement. The body 15 is fabricated by cutting a 4" steel slab to a size such that it moves freely in the space between the end plates 18. The end plates 18 and the side plates 16 and 17 are fabricated from 2" steel plates which are cut to size.

A scraper bar 21 extends along the length of the lower end of the body 15 and has a length such that its opposite ends 22 project beyond the opposite ends 23 of the frame 14. The bar 21 is integral with the body 15 and is formed when the 4" slab is cut to form the body 15. The lower end 24 of the scraper bar 21 is chamfered with a taper in the direction of the draft bar 12 so that its forward edge 25 will dig into the scale on the hearth floor with a digging action when the scraper is operated in a manner to be described. Tapered teeth 26 are provided at equally spaced intervals along the length of the edge 25. Each of the teeth 26, as best shown in FIGURE 9, comprises a steel bracket 27 welded to the scraper bar 21, and each has a cutting point 28 projecting angularly downwardly from the bar 21 in a manner such that it forms an angular extension of the surface 24. A surface 29 of Stellite or other hardened tool steel, such as tungsten carbide, is welded to the bottom surface of the brackets 27 to improve the cutting action of the teeth 26.

A stop bar 31 has a welded connection with the upper end of the body 15 of the scraper and has a length such that its ends 32 extend beyond the frame end plates 18. The ends 32 thus engage the upper edges of the frame end plates 18 to limit downward movement of the scraper in its socket 14. The weight of the body 15 and of the stop bar 31 provide a gravitational bias for downward movement of the cutter bar 21 and its teeth 26 with a digging action into scale on the hearth 1. If additional bias is needed to improve the scraping action of the cutter bar 21 and its teeth 26, additional weight may be applied, for example, by welding a 6" round 33 in position on top of the stop bar 32.

Skids 34 are secured by welding to the opposite ends 22 of the cutter bar 21 to provide a support therefor and to prevent the teeth 26 from digging into the refractory surface of the hearth floor 6 and consequent damage thereto. The skids 34 are fabricated by cutting 2" steel plates which are shaped to provide a horizontal bottom surface 35 which moves over the hearth floor 6 or scale thereon with a sliding action. The surfaces 35 are positioned at a level slightly below the bottom points 36 of the scraper teeth 26, as best shown in FIGURE 8, to eliminate any possibility of the points 36 digging into the hearth floor 6. At their forward ends, the bottom surfaces 37 of the skids 34 have an upward curvature so that they will operate to lift the scraper with a camming action over any obstacle in the path of its movement as it is withdrawn from the furnace by the peel 2.

The draft bar 12 has upwardly inclined camming surfaces 38 and 39 at opposite ends thereof so that it will ride over obstructions in its path of movement.

In operation, the scraper 8 is mounted on the peel 2 by pivoting the jaws 4 into clamping engagement with the draft bar 12 as shown in FIGURES 1 and 4 of the drawings. The peel 2 is then moved to the left as viewed in FIGURE 1 and lowered to the down position shown in dotted lines with its skids 34 resting on the hearth floor surface 6, after which it is operated to drag the scraper 8 across the hearth 1, to the right as viewed in FIGURE 1, to level the scale that has accumulated thereon. Excessive quantities of scale pile up against the forward vertical surface 40 of the scraper blade during this movement and are removed from the furnace and delivered to a scale collecting hopper 41 under the table 3, the transfer of excess scale in this manner taking place over a steel plate 42 (FIGURE 1) which is inserted through the door (not shown) of the furnace to bridge the space between the outer edge of the hearth 1 and the inner edge of the discharge table 3. After withdrawal of the peel 2 from the furnace, the indexing control mechanism for the hearth 1 is actuated to rotate it a few degrees to a new position for reinsertion of the scraper 8 and its operation by the peel 2 to level scale on an adjacent portion of the hearth 1. Indexing rotation of the hearth and operation of the scraper 8 in this manner is repeated until the full 360° of the hearth 1 is conditioned for a subsequent billet heating operation.

From the foregoing it will be apparent that operation of of the scraper 8 in conjunction with the peel 2 and indexing rotation of the hearth 1 as described above are effective to level the scale on the hearth floor to an extent that its surface is flat and horizontal and furnishes a uniform support along the entire length of billets resting thereon so that they may be heated to the desired temperature without any warping action or the production of curved and crooked billets. Excessive accumulations of scale on the hearth 1 are of course removed by the scraper blade 15 over the plate 42. Attention is particularly directed to the fact that conditioning of the hearth 1 in this manner is effected without the necessity of cooling the furnace and thus reduces the mill down-time from the period of three to five days previously required to a period of less than eight hours. It should also be noted that the mounting of the scraper blade in the frame 8 and its gravitational bias for downward movement therein enables movement of the scraper edge 25 and teeth 26 over the hearth with a floating action to effect a scale digging operation, and that the support provided by the skids 34 protects the hearth floor 6 by maintaining the scraper edge 25 and teeth 26 out of digging engagement therewith.

While the embodiment of the invention shown and described is specific to the use of the scraper 8 with a peel 2 for leveling scale on a rotary hearth 1, it will be understood that the scraper 8 may be used for leveling loose material on supporting surfaces in other apparatus, such as screening apparatus, and that other adaptations and modifications may be made.

I claim:

1. A scraper apparatus for leveling iron oxide scale on the ring-shaped hearth of a rotary furnace comprising, the combination with a billet handling peel movable over a radial path with respect to said hearth and having billet gripping jaws for engaging and supporting a billet thereon, of a frame, a draft bar extending horizontally from a point located centrally on said frame for engagement by said gripping jaws, said frame being held in a vertical position when said draft bar is engaged by said jaws to support said frame on said peel, a scraper mounted for vertical movement on said frame and having scraper means extending horizontally along its lower edge for scraping engagement with said scale upon movement of said frame by said peel over said radial path, and means including a pair of skids at opposite ends of said scraper means for sliding engagement with said scale and operating to hold said scraper means out of scraping engagement with said hearth.

2. In a scraper of the character described, a horizontal draft bar, a rectangular frame attached to one end of said draft bar and defining a rectangularly-shaped opening extending vertically therethrough, said draft bar being attached to said frame at a point located centrally of one side thereof, a guide plate movable vertically in said frame opening, a scraper bar extending along the lower end of said plate and positioned below the lower end of said frame for scraping engagement with material to be leveled, and means including skids at opposite ends of said scraper for sliding movement over the surface of said material and for holding said bar out of scraping engagement with the structure on which said material is carried.

3. A scraper as defined in claim 2 characterized by said scraper bar having a length such that opposite ends thereof project beyond the ends of said frame and engage therewith to limit vertical movement of said bar in an upward direction relative to said frame.

4. A scraper as defined in claim 2 characterized by said scraper plate having weights mounted on its upper end to bias its movement downwardly relative to said frame and to provide a gravitational bias for downward movement of said plate and said scraper bar into scraping engagement with said material.

5. A scraper apparatus for leveling iron oxide scale on the ring-shaped hearth of a rotary furnace comprising, the combination with a billet handling peel movable over a radial path with respect to said hearth and having billet gripping jaws for engaging and supporting a billet thereon, of a frame, a draft bar extending horizontally from a point located centrally on said frame for engagement by said gripping jaws, said frame being held in a vertical position when said draft bar is engaged by said jaws to support said frame on said peel, and a scraper mounted for vertical movement on said frame and having scraper means extending horizontally along its lower edge for scraping engagement with said scale upon movement of said frame by said peel over said radial path.

References Cited

UNITED STATES PATENTS

| 2,335,150 | 11/1943 | Johnson. | |
| 1,362,336 | 12/1920 | Maxwell. | |
| 1,830,951 | 11/1931 | Lovett | 214—23 |
| 2,495,096 | 1/1950 | Grimaldi | 198—224 |
| 3,240,323 | 3/1966 | Kitson | 198—224 |

ROBERT G. SHERIDAN, Primary Examiner

U.S. Cl. X.R.

15—93, 105; 198—222